(12) United States Patent
Yamazaki

(10) Patent No.: US 8,179,558 B2
(45) Date of Patent: May 15, 2012

(54) IMAGE PROCESSING APPARATUS, IMAGE PROCESSING METHOD, PROGRAM AND STORAGE MEDIUM CONSTRUCTED TO GENERATE PRINT DATA INCLUDING A BITMAP IMAGE AND ATTRIBUTE DATA OF EACH PIXEL OF THE BITMAP IMAGE

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 661 days.

(21) Appl. No.: 12/265,619

(22) Filed: Nov. 5, 2008

(65) Prior Publication Data

US 2009/0123075 A1 May 14, 2009

(30) Foreign Application Priority Data

Nov. 8, 2007 (JP) ................................. 2007-291140

(51) Int. Cl.
*G06K 15/00* (2006.01)
(52) U.S. Cl. ........................... 358/1.18; 358/1.1; 358/1.9
(58) Field of Classification Search .......... 382/170–171, 382/181–224
See application file for complete search history.

(56) References Cited

U.S. PATENT DOCUMENTS

| | | | | |
|---|---|---|---|---|
| 5,821,929 A | 10/1998 | Shimizu et al. | ............... | 345/338 |
| 5,907,835 A | 5/1999 | Yokomizo et al. | ................ | 707/1 |
| 7,587,413 B2 * | 9/2009 | Nagral et al. | .......................... | 1/1 |
| 2001/0055426 A1 * | 12/2001 | Yamazaki | ..................... | 382/199 |
| 2005/0111053 A1 * | 5/2005 | Yoshida et al. | ............... | 358/448 |
| 2006/0114484 A1 | 6/2006 | Kitora | | |
| 2007/0192702 A1 | 8/2007 | Takano | | |

FOREIGN PATENT DOCUMENTS

| | | | |
|---|---|---|---|
| JP | 1125113 | A | 5/1989 |
| JP | 10217547 | A | 8/1998 |
| JP | 11265267 | A | 9/1999 |
| JP | 2006155381 | A | 6/2006 |
| JP | 2006221569 | A | 8/2006 |
| JP | 2007025969 | A | 2/2007 |
| JP | 2007144842 | A | 6/2007 |
| JP | 2007158606 | A | 6/2007 |
| JP | 2007213501 | A | 8/2007 |
| JP | 2007286961 | A | 11/2007 |

OTHER PUBLICATIONS

Office Action dated Nov. 11, 2011 in corresponding Japanese Application No. 2007-291140.

* cited by examiner

*Primary Examiner* — Twyler Haskins
*Assistant Examiner* — Marcellus Augustin
(74) *Attorney, Agent, or Firm* — Fitzpatrick, Cella, Harper & Scinto

(57) ABSTRACT

It is an object of the present invention to provide an image processing apparatus having a function to store print data in a searchable manner. In order to achieve the object, when print data including a bitmap image and attribute data of each pixel of the bitmap image is received, meta data is generated by executing a character recognition processing based on pixels having a character attribute in the attribute data. Further, vector data indicating a character outline is generated. Then, a document including meta data and vector data is generated.

5 Claims, 17 Drawing Sheets

IMAGE PROCESSING APPARATUS, IMAGE PROCESSING METHOD, PROGRAM AND STORAGE MEDIUM CONSTRUCTED TO GENERATE PRINT DATA INCLUDING A BITMAP IMAGE AND ATTRIBUTE DATA OF EACH PIXEL OF THE BITMAP IMAGE

BACKGROUND OF THE INVENTION

1. Field of the Invention

The present invention relates to an image processing apparatus connected to a network and having a function to transmit and receive print data, an image processing method, a program, and a storage medium.

2. Description of the Related Art

Storing image data input from an image input device in a secondary storage device of an image output device as files allows a user to extract and repeatedly output whenever he/she wants. Such a function to store, in the secondary storage device of the image output device, input data in the format of files for the purpose of reuse is called a box function. In addition, a file system for storing, in the secondary storage device of the image output device, input data in the format of files for the purpose of reuse is called a box.

The files in the box are bitmap data read by a document scanner and PDL data received from a host computer connected over a network. It becomes difficult to search list information of file names and thumbnails, etc., for a target file when the number of files stored in the box increases.

Accordingly, user-friendliness is dramatically improved when a user inputs a keyword included in the target file from a UI (User Interface) to display a list of only files that matches the keyword using a search.

When the search target file is PDL (Page Description Language) data, a drawing object to be printed as character has been generally described in the PDL data as font information accompanied by character codes. It is therefore possible to directly search the PDL data for a character string. Moreover, even when data is converted to a format to lose character code information when being stored in the box, by separately storing only the character code information at the time of storing in the box and storing the same in an accompanying manner as meta data, it becomes possible to search the data stored in the box.

On the other hand, even in data to be used for PDL printing, the drawing object data to be printed as character is not accompanied by character code information in some cases.

One of the cases is when print data is developed into a bitmap on a host computer. When normal PDL data is used for output, image development is performed by use of a drawing parameter unique to an image output device. Therefore, an unexpected defective image may be produced. Occurrence of interference between a dot pattern drawing of an original image and a halftone unique to the image output device can be mentioned, for example. Moreover, depending on the contents of PDL data, developing the PDL data on the host computer may result in faster processing. On such an occasion, the user can select a mode for image development on the host computer.

Moreover, there is a case where a device (raster image processor, hereinafter referred to as "RIP") that performs image development and a device that performs output using a developed image are separately provided. However, even in such a case, if the box function is equipped on the image output device, character code information cannot be added to data in the box.

In such a situation, since no character code information to be used for a search remains in data to be received by the image output device, it is impossible to add meta data using received character codes.

SUMMARY OF THE INVENTION

In order to solve the above problems, an image processing apparatus according to the present invention includes: a receiving unit that receives print data including a bitmap image and attribute data of each pixel of the bitmap image; a meta data generating unit that generates meta data by executing a character recognition processing based on pixels having a character attribute in the attribute data; a vector data generating unit that generates vector data indicating a character outline based on the pixels having a character attribute in the attribute data; and a document generating unit that generates a document including meta data generated by the meta data generating unit and vector data generated by the vector data generating unit.

According to the present invention, even when data received by the image processing apparatus does not include character code information, it becomes possible to add searching meta data to box-storing data.

Moreover, according to the present invention, even when print data is developed into a bitmap on a host computer or developed into an image by an external RIP, received print data not including character code information can be stored in the box while adding thereto searching meta data.

Further features of the present invention will become apparent from the following description of exemplary embodiments with reference to the attached drawings.

DESCRIPTION OF THE EMBODIMENTS

Embodiment 1

Hereinafter, a best mode for carrying out the present invention will be described with reference to the drawings.

Figure 1:
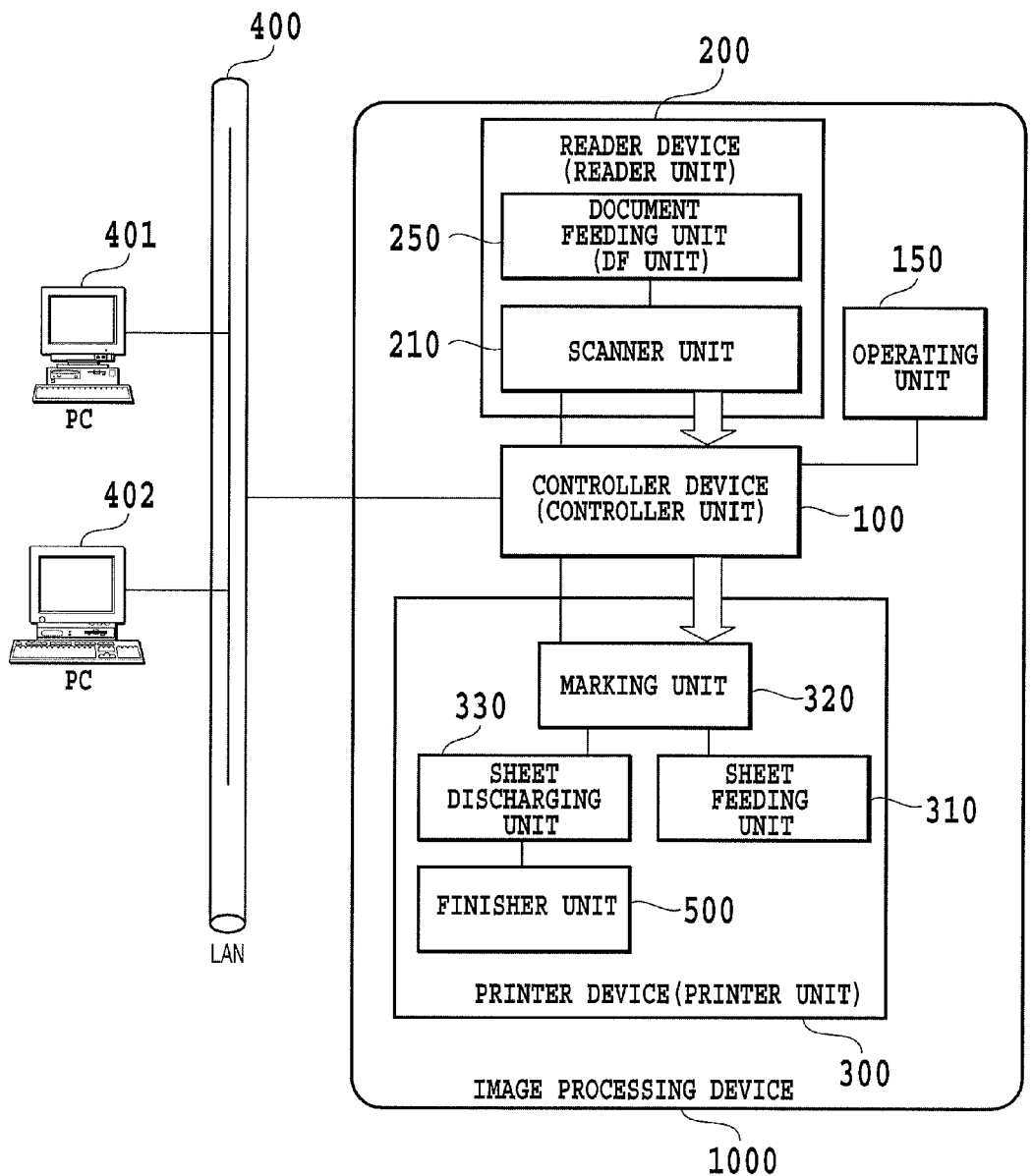
FIG. 1 is a view showing an example of a system in an embodiment.

An image processing apparatus suitable for carrying out the present invention will be described with reference to FIG. 1. FIG. 1 shows an outline of an image processing apparatus 1000.

In FIG. 1, a reader device (reader unit (scanner)) 200 optically reads a document image and converts the same to image data. The reader 200 includes a scanner unit 210 having a function for reading a document and a document feeding unit 250 having a function for conveying a document sheet.

A printer device (printer device) 300 conveys a recording sheet, prints thereon image data as a visible image, and discharges the sheet outside.

The printer device 300 includes a sheet feeding unit 310, a marking unit 320, a sheet discharge unit 330, and a finisher unit 500.

Here, the sheet feeding unit 310 has a plurality of types of recording sheet cassettes. In addition, the marking unit 320 has a function to transfer and fix image data onto a recording sheet. In addition, the sheet discharge unit 330 has a function to output a printed recording sheet outside. In addition, the finisher unit 500 performs a stapling process and a sorting process.

A controller device (controller unit) 100 is electrically connected with the reader 200 and the printer device 300, and is further connected, via a LAN (Local Area Network) 400, with PCs (host computers) 401 and 402, and various servers on the Internet.

The controller device 100 controls the reader 200 to read image data of a document, controls the printer device 300 to output the image data onto a recording sheet, and thereby provides a copying function.

In addition, the controller device 100 also provides a scanner function, a printer function, and a box function.

Here, the scanner function is a function to convert image data read from the reader 200 to code data, and transmit the same to a host computer via the LAN 400. In addition, the printer function is a function to convert code data received from the host computer via the LAN 400 to image data, and output the same to the printer device 300. In addition, the box function is a function to store image data read from the reader 200 and image data obtained by converting code data received from the host computer in a secondary storage device of the controller device 100.

An operating unit 150 is connected to the controller device 100, includes a liquid crystal touch panel, and provides a user I/F (interface) for operating an image input/output system.

Figure 2:
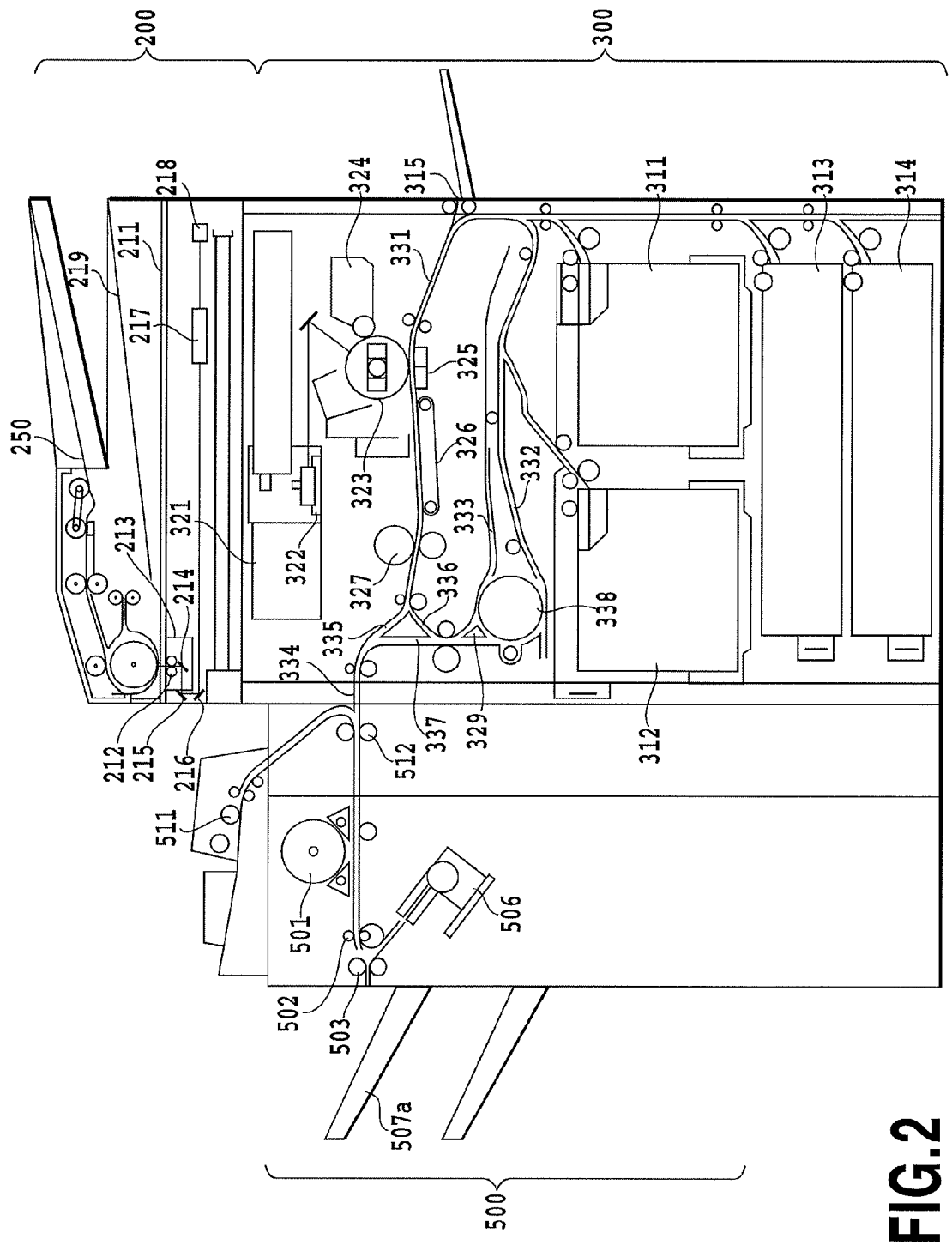
FIG. 2 is a side sectional view showing an example of the structure of an MFP of an embodiment of the present invention.

FIG. 2 is a side sectional view showing an MFP (Multifunction Peripheral) including the reader 200 and the printer device 300. The document feeding unit 250 of the reader unit is for feeding documents, in order from the head, one at a time onto a platen glass 211, and discharging the document on the platen glass 211 to a discharge tray 219 after completion of a reading operation of the document. When a document has been conveyed onto the platen glass 211, a lamp 212 is turned on. Then, an optical unit 213 starts to move, so that the document is exposed and scanned. A reflected light from the document at this time is guided by mirrors 214, 215, and 216 and a lens 217 to a CCD image sensor (hereinafter, referred to as a CCD) 218. Thus, an image of the scanned document is read by the CCD 218. Image data output from the CCD 218 is transferred to the controller device 100 after being applied with a predetermined processing.

A laser driver 321 of the printer device 300 is for driving a laser light emitting unit 322, and makes the laser light emitting unit 322 emit laser light according to image data output from the controller device 100. This laser light is irradiated onto a photoconductor drum 323, so that a latent image according to the laser light is formed on the photoconductor drum 323. The part of the photoconductor drum 323 with the latent image is adhered with a developing agent by a developer 324.

Then, at a timing in synchronization with a start of irradiation of laser light, a recording sheet is fed from any of a cassette 311, a cassette 312, a cassette 313, a cassette 314, and a manual feed tray 315. Then, the recording sheet is conveyed to a transferring unit 325 through a conveying path 331, and the developing agent adhered to the photoconductor drum 323 is transferred to the recording sheet.

The recording sheet carrying the developing agent is conveyed by a conveying belt 326 to a fixing unit 327, and by heat and pressure of the fixing unit 327, the developing agent is fixed to the recording sheet. Thereafter, the recording sheet that has passed through the fixing unit 327 is discharged through a conveying path 335 and a conveying path 334. Alternatively, for discharging a recording sheet with a printed face inverted, the recording sheet is guided up to a conveying path 336 and a conveying path 338, and reversely conveyed therefrom to pass through a conveying path 337 and the conveying path 334.

Moreover, with both-face recording set, the recording sheet is guided, after passing through the fixing unit 327, to a conveying path 333 from the conveying path 326 by a flapper 329. Thereafter, the recording sheet is reversely conveyed, and conveyed, by the flapper 329, to the conveying path 338 and a re-feed conveying path 332. The recording sheet guided to the re-feed conveying path 332 passes through the conveying path 331 at the timing described above, and is fed to the transferring unit 325.

The recording sheet discharged from the conveying path 334 is conveyed to the finisher unit 500.

The conveyed recording sheet is first sent to a buffer unit 501. Herein performed according to the case is buffering by winding the recording sheet that has arrived while being conveyed around a buffer roller. For example, when a processing such as stapling to be performed downstream thereof takes time, the convening speed of the recording sheet to arrive while being conveyed from the main body can be maintained constant by using the buffer unit, which allows contributing to an improvement in throughput.

The recording sheet is thereafter discharged to a stack tray 507a by an upstream discharge roller pair 502 and a downstream discharge roller pair 503.

<Controller Unit>

Figure 3:
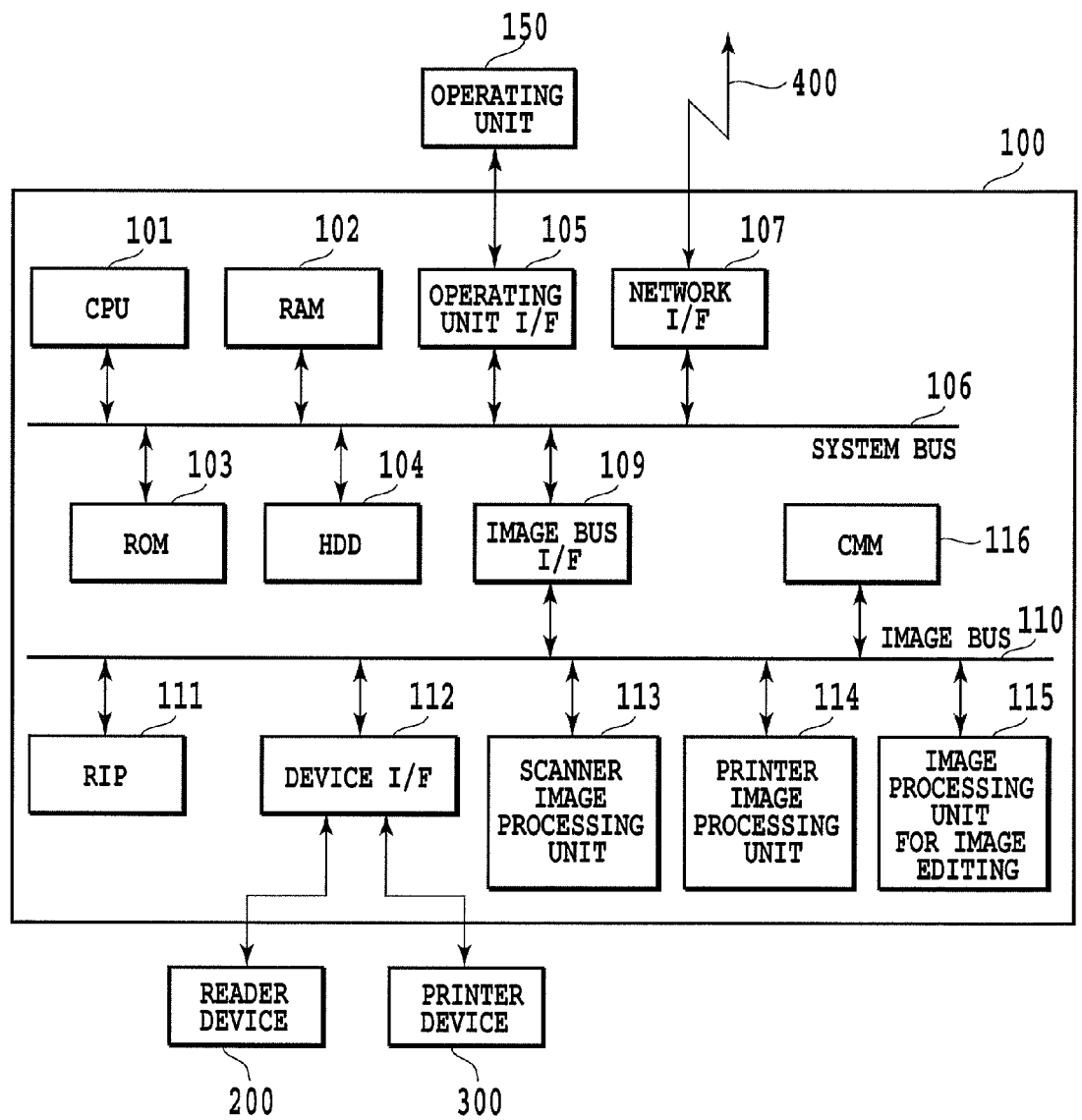
FIG. 3 is a block diagram showing an example of the controller unit of each device in an embodiment.

FIG. 3 is a block diagram showing an example of the controller unit (controller unit (controller device)) of the MFP in the present embodiment. In FIG. 3, the controller device 100 connects with the reader 200 being an image input device and the printer device 300 being an image output device, and performs control for reading of image data and printing out. Moreover, the controller device 100 connects with the LAN

400 to thereby perform control for inputting and outputting image information and device information by way of the LAN 400.

In FIG. 3, a CPU 101 denotes a central processing unit to control the MFP as a whole. A RAM 102 is a system work memory for the CPU 101 to operate, and is also an image memory for temporary storage of input image data. Further, a ROM 103 is a boot ROM, which stores a system boot program. An HDD 104 denotes a hard disk drive, which stores system software for various types of processing and input image data, etc. An operating unit I/F (interface) 105 is an interface unit with the operating unit 150 including a display screen capable of displaying image data etc., and outputs operation screen data to the operating unit 150. Moreover, the operating unit I/F (interface) 105 assumes the role of transmitting information input by an operator from the operating unit 150 to the CPU 101. A network I/F (interface) 107 is realized by, for example, a LAN card, and connected to the LAN 400 to input and output information to and from an external device. The above units are arranged on a system bus 106.

An image bus I/F (interface) 109 is an interface to connect the system bus 106 with an image bus 110 that transfers image data speedily, and serves as a bus bridge to convert a data structure. The image bus 110 is connected with a RIP (Raster Image Processor) 111, a device I/F (interface) 112, a scanner image processor 113, a printer image processor 114, and an image processor 115 for image editing. In addition, the image bus 110 is also connected with a CMM (Color Management Module) 116.

The RIP (Raster Image Processor) 111 develops PDL (Page Description Language) codes and vector data to be described later into an image. The device interface I/F (interface) 112 connects the reader 200 and the printer device 300 with the controller device 100, and performs synchronous/asynchronous conversion of image data.

Moreover, the scanner image processor 113 applies various types of processing such as a correction, processing, and editing to image data input from the reader 200. The printer image processor 114 performs processing such as a correction and a resolution conversion according to a printer engine for image data to be printed out. The image processor 115 for image editing performs various types of image processing such as a rotation of image data and a compression and expansion of image data. The CMM 116 is a dedicated hardware module that applies, to image data, a color conversion processing (also called a color space conversion processing) based on a profile and calibration data. The profile is information like a function for converting color image data expressed in a color space (for example, L*a*b) dependent on a device into a color space independent of the device. The calibration data is data to calibrate color reproducibility of the reader 200 and the printer device 300 in the MFP.

<Controller Software>

Figure 4:
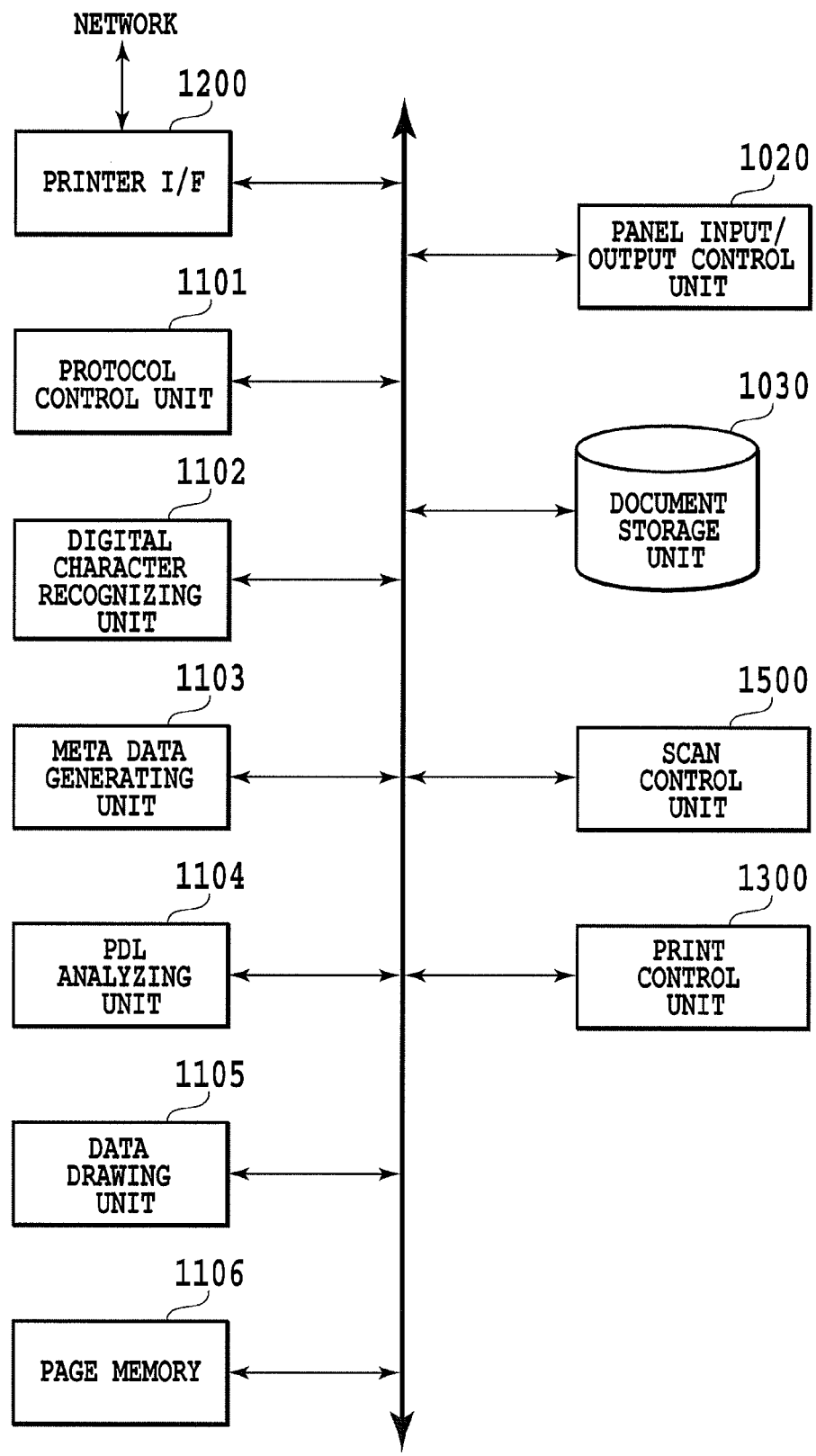
FIG. 4 is a block diagram showing an example of controller software in an embodiment.

FIG. 4 is a block diagram showing controller software to control operation of the MFP.

A printer I/F (interface) 1200 is a unit that inputs and outputs to and from the outside. A protocol control unit 1101 is a unit that communicates with the outside by analyzing and transmits a network protocol.

A digital character recognizing unit 1102 generates, from a bit map image, using digital character recognition (OCR), character codes as a recognition result. In addition, the digital character recognizing unit 1102 generates vector data (vectorization) from character outlines extracted in the process of digital character recognition.

In a meta data generating unit 1103, character codes obtained as a result of digital character recognition and vector data generated in the process of digital character recognition in the digital character recognition unit 1102 are combined to generate meta data. The meta data is additional data for a search not necessary for a drawing processing.

A PDL analyzing unit 1104 is a unit that analyzes PDL data to convert the same to a DL (Display List) of intermediate codes in a format to be processed more easily. The intermediate codes generated in the PDL analyzing unit 1104 are transferred to a data drawing unit 1105 to be processed. The data drawing unit 1105 is for developing the above-mentioned intermediate codes into bitmap data, and the developed bitmap data is successively drawn in a page memory 1106.

The page memory 1106 is a volatile memory that temporarily retains bitmap data developed by the data drawing unit 1105.

A panel input/output control unit 1020 is for controlling input and output from the operating unit 150.

A document storage unit 1030 is a unit that stores a data file including vector data, a DL (Display List), and meta data per one block (job) of an input document. The document storage unit 1030 is realized by a secondary storage device such as a hard disk. Also, this data file is referred to as a "document" in the present embodiment.

A scan control unit 1500 performs various types of processing such as a correction, processing, and editing for image data input from the reader 200.

A print control unit 1300 converts the contents of the page memory 1106 to video signals and performs an image transfer to the printer device 300. The printer device 300 is a print mechanism unit for forming the received video images as a visible image on a recording sheet.

<Data Processing by Controller Unit>

Next, description will be given of how the vector data, DL (Display List), and meta data of a document are generated.

Figure 7:
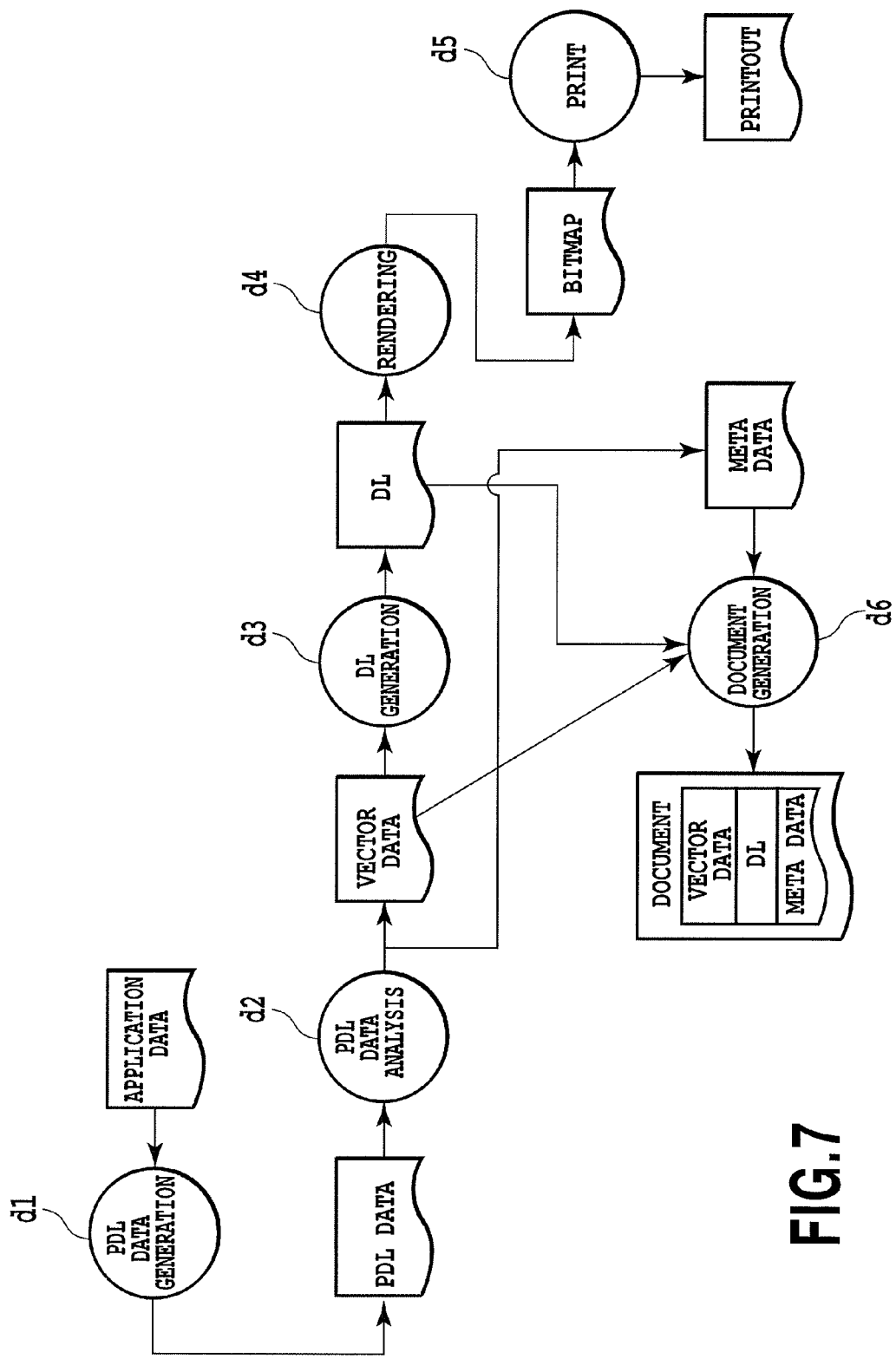
FIG. 7 is a diagram showing an example of dataflow in general PDL printing.
Figure 8:
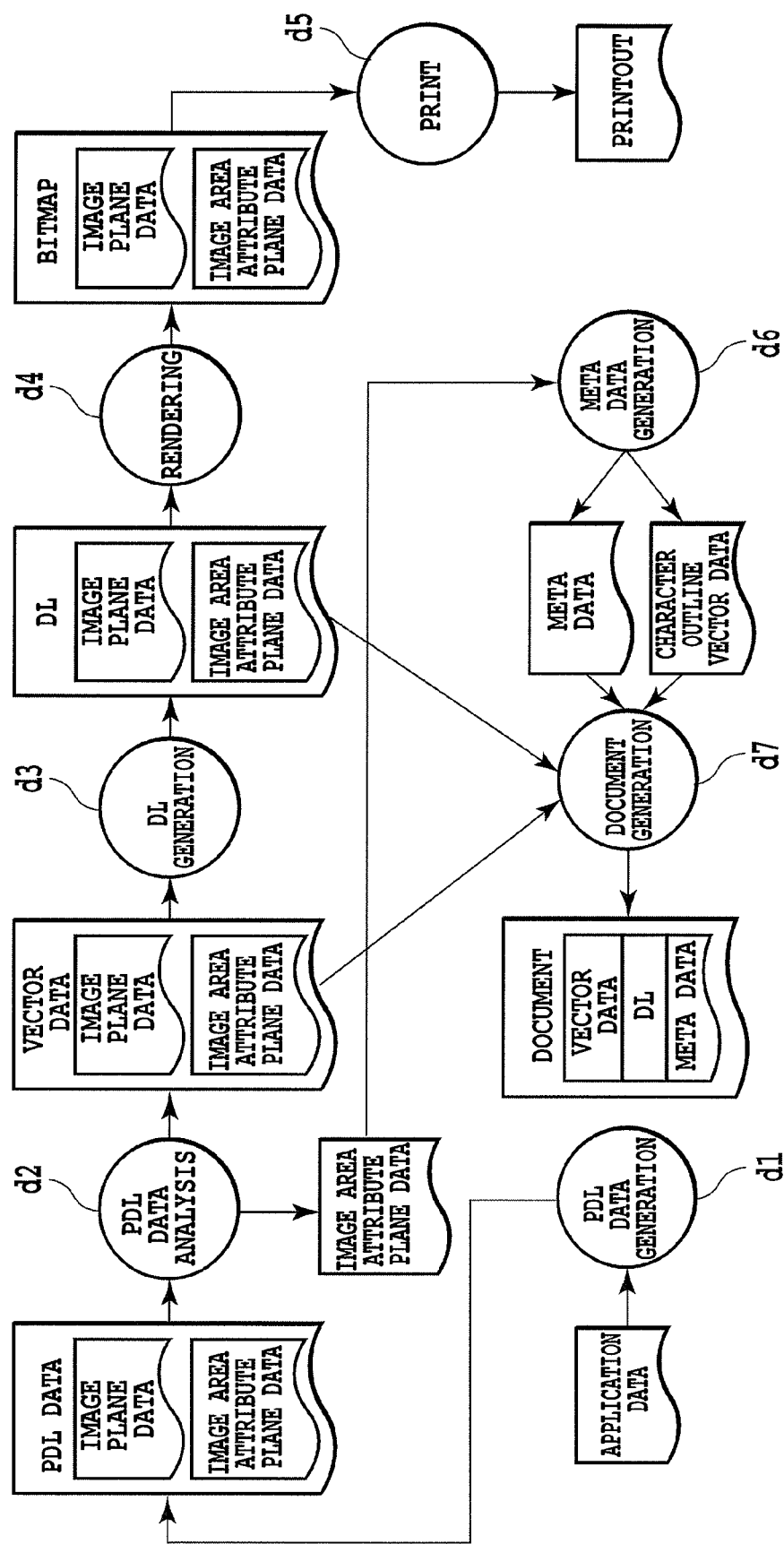
FIG. 8 is a diagram showing an example of dataflow in Embodiment 1.
Figure 9:
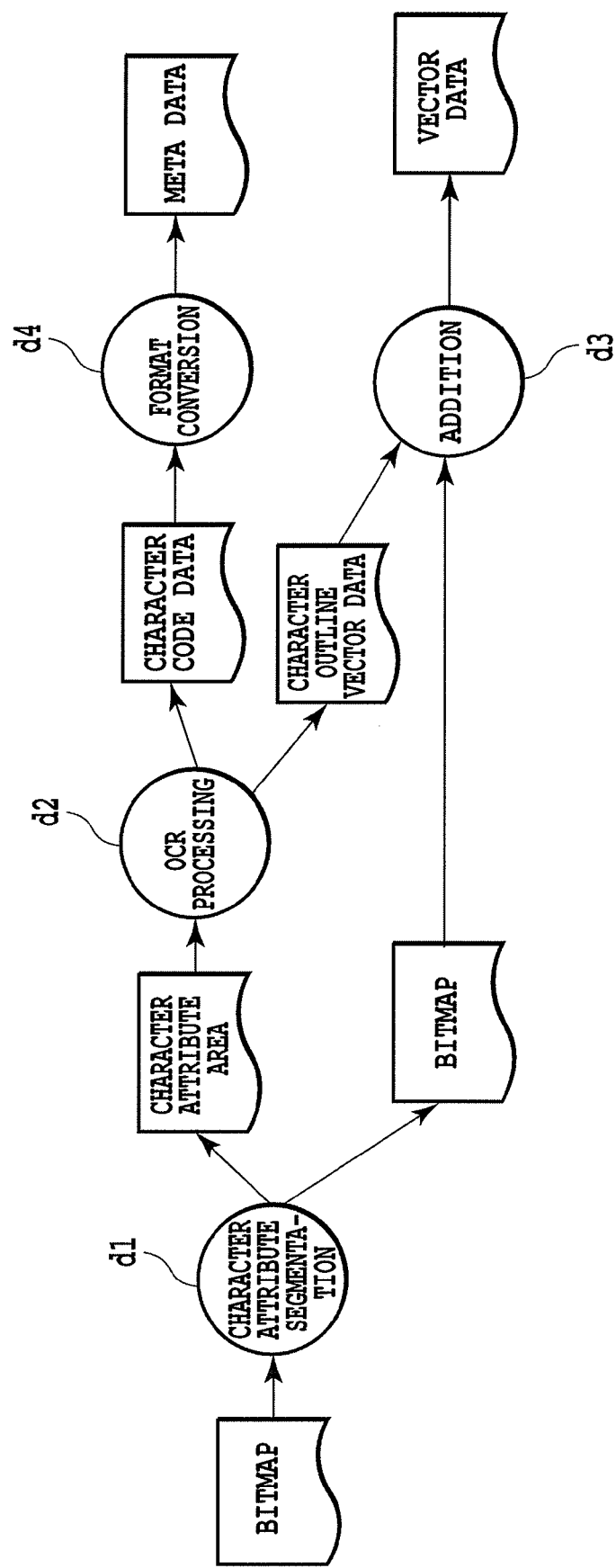
FIG. 9 is a diagram showing an example of dataflow for meta data generation in an embodiment.

FIG. 7, FIG. 8, and FIG. 9 show examples of dataflow by the controller unit in the present embodiment.

FIG. 7 shows an example of dataflow in PDL (Page Description Language) printing. The PDL printing means a printer operation to receive a PDL generated by a printer driver on a PC (Personal Computer) and output the same when an instruction on printing is issued from application software on the PC.

First, in the PC 401, application software such as a word processor, a spreadsheet software, and a Web browser is operating. Data handled by the application software is called application data. As shown in FIG. 7, a printer driver operating on a host PC performs a processing d1 to convert application data to PDL data so as to generate PDL data. The PDL data to be generated here includes character object data defined by character codes and font data, graphics object data that defines line drawing and a paint of an area, and image object data including a bitmap. Further, the PDL data may also include, besides the object data mentioned above, variables and procedures serving as a programming language, and a device control command for an instruction on operation of a digital MFP. The generated PDL data is transmitted to the controller device 100 through a network.

As shown in FIG. 7, PDL data received by the controller device 100 is analyzed by a PDL data analysis processing d2, so that vector data suitable for a DL generation to be described later is generated.

As shown in FIG. 7, next, a DL is generated from the vector data by a DL generation processing d3, and the generated DL is stored in a document and also sent to a rendering processing d4 to be developed into a bitmap. Then, the developed bitmap is recorded onto a paper medium by a print processing d5 to become a printout.

The vector data and DL generated in this process are, as shown in FIG. 7, stored in a document by a document generation processing d6. The document thus generated is stored in a storage such as a BOX, and used when being reused (re-printing etc).

Moreover, although, as PDLs, a variety of types such as LIPS (LBP Image Processing System) (registered trademark) and PS (PostScript (registered trademark)) exist, some PDLs have character string information (character codes). In this case, meta data (a search keyword etc.) is generated from a character string (character codes) at the time of a PDL analysis, and stored in a document.

FIG. 8 is a diagram showing an example of dataflow in an image-mode processing form in PDL printing. Here, description will be given for a case where application data is converted to a bitmap image (bitmap image), and a PDL prepared by the image data is used as a processing object.

First, as shown in FIG. 8, a printer driver operating on the PC 401 performs a processing d1 to convert application data to PDL data. At this time, the PDL data includes bitmap image data of the entire face of a page to be output. In detail, the PDL data includes an image plane including pixels having color values expressed by a color system a human can visually perceive such as RGB or CMYK and an image area attribute plane including pixels having any attribute of "text," "graphics," and "image." More specifically, generated is PDL data including image data formed in a bitmap and bitmap-like attribute data indicating the attribute (text/graphics/image) of each pixel of that image. Also, the attribute of each pixel can be determined when preparing a bitmap image from application data. It is possible to determine the attribute based on, for example, whether being in an area where a pixel value generated in response to a character drawing command has been drawn in the application data, and whether being in an area where a pixel value generated in response to an image data drawing command has been drawn in the application data.

The image plane mentioned above may include images formed in a bitmap for one page or a plurality of pages.

Moreover, in the present invention, a plurality of planes exists in some cases. With a plurality of planes, the planes may be called a first plane and a second plane.

Further, the PDL data may also include, besides the object data mentioned above, variables and procedures serving as a programming language, and a device control command for an instruction on operation of a digital MFP. The generated PDL data is transmitted to the controller device 100 through a network.

As shown in FIG. 8, PDL data received by the controller device 100 is analyzed by a PDL data analysis processing d2, so that vector data is generated, while a copy of image area attribute plane data is generated. However, the vector data generated in this example includes bitmap data necessary for drawing a full-face image and coordinate conversion information.

Next, as shown in FIG. 8, a DL is generated from the vector data by a DL generation processing d3. The generated DL is stored in a document and also sent to a rendering processing d4 to be developed into a bitmap. The developed bitmap is recorded onto a paper medium by a print processing d5 to become a printout.

The vector data and DL generated in this process are, as shown in FIG. 8, stored in a document by a document generation processing d7.

Moreover, from the copy of the image area attribute plane data generated in the processing d2 of FIG. 8, meta data and character outline vector data are generated by a meta data generation processing d6, and these are also stored in the document by the document generation processing d7. The processing d6 will be described later by use of FIG. 9.

FIG. 9 shows an example of a detailed dataflow of the meta data generation processing d6 shown in FIG. 8.

First, as shown in FIG. 9, a character attribute area is segmented by an image area attribute segmentation processing d1. More specifically, a text attribute area composed of pixels having a character attribute is extracted from an image area attribute plane (bitmap indicating attributes). Then, as shown in FIG. 9, an image of the extracted character attribute area including text pixels is, by a character recognition processing and a vectorization processing executed by a character recognition (OCR) processing d2, converted to character outline vector data and character code data.

Moreover, as shown in FIG. 9, a character string including the character code data generated by the character recognition processing is regulated by a format conversion processing d4 into a format to be described later, whereby meta data is generated.

Moreover, in the processing d1, based on an area with an attribute other than the character attribute and a bitmap image included in the PDL, a bitmap of an image area etc., can be obtained. The obtained bitmap and the character outline vector data generated by the vectorization processing described above are generated, by a processing d3, as vector data to be stored in a document.

Figure 15:
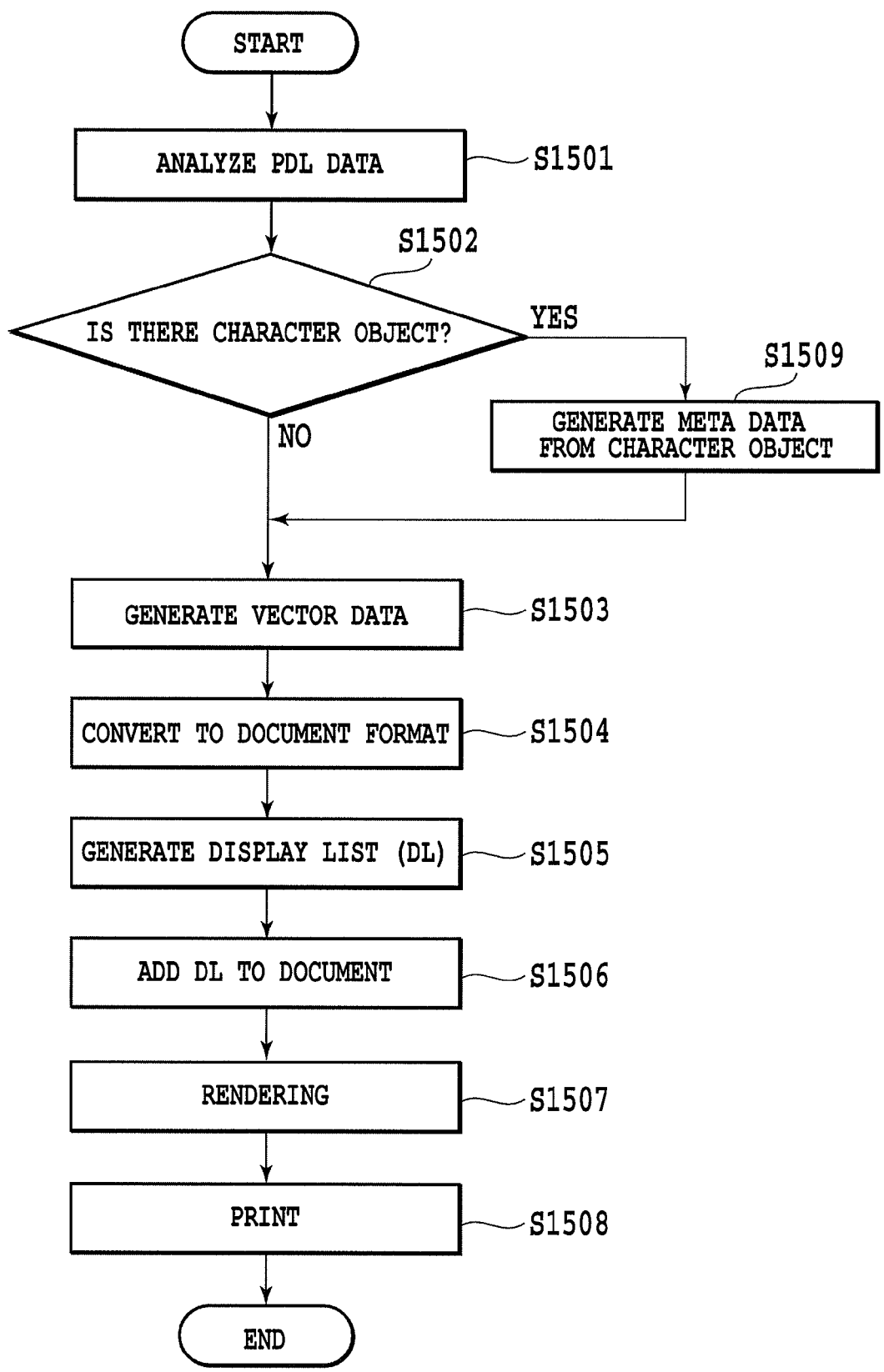
FIG. 15 is a diagram showing an example of dataflow for generating a document from PDL and printing in an embodiment.

FIG. 15 shows an example of a process of generation and printing of a document from a PDL. This is a process for receiving normal PDL data not of an image mode and generating and printing out a document. More specifically, it suffices to perform such a process as in FIG. 15 in an image processing apparatus that does not handle an image-mode PDL. An image processing apparatus that handles an image-mode PDL will be described later by use of FIG. 16. The process of the flowchart shown in FIG. 15 is executed by the CPU 101.

First, in step S1501, PDL data is analyzed. Next, in step S1502, it is judged whether the PDL data includes a character object. If it is judged in step S1502 that the PDL data includes a character object, the process proceeds to step S1509, where meta data is generated based on a character code in the character object. Thereafter, the process proceeds to step S1503.

If it is judged in step S1502 that the PDL data does not include a character object, the process proceeds to step S1503. In step S1503, an object of the PDL data (a character object, a graphics object such as a line drawing, etc.) is converted to vector data, and then the process proceeds to step S1504 to generate a document. In the document generated in step S1504, the vector data generated in step S1503 and the meta data generated in step S1509 are stored, and the document is stored in a storage medium such as a BOX.

Next, a DL (Display List) is generated in step S1505. The DL to be generated here is intermediate codes suitable for performing a rendering processing in a model of the image processing apparatus. In step S1506, the generated DL is added to the document.

A document is generated by a flow up to here. Further, the DL generated in step S1505 is rendered by a rendering processing in step S1507, and printing is executed by a print processing onto a paper medium in step S1508.

Figure 16:
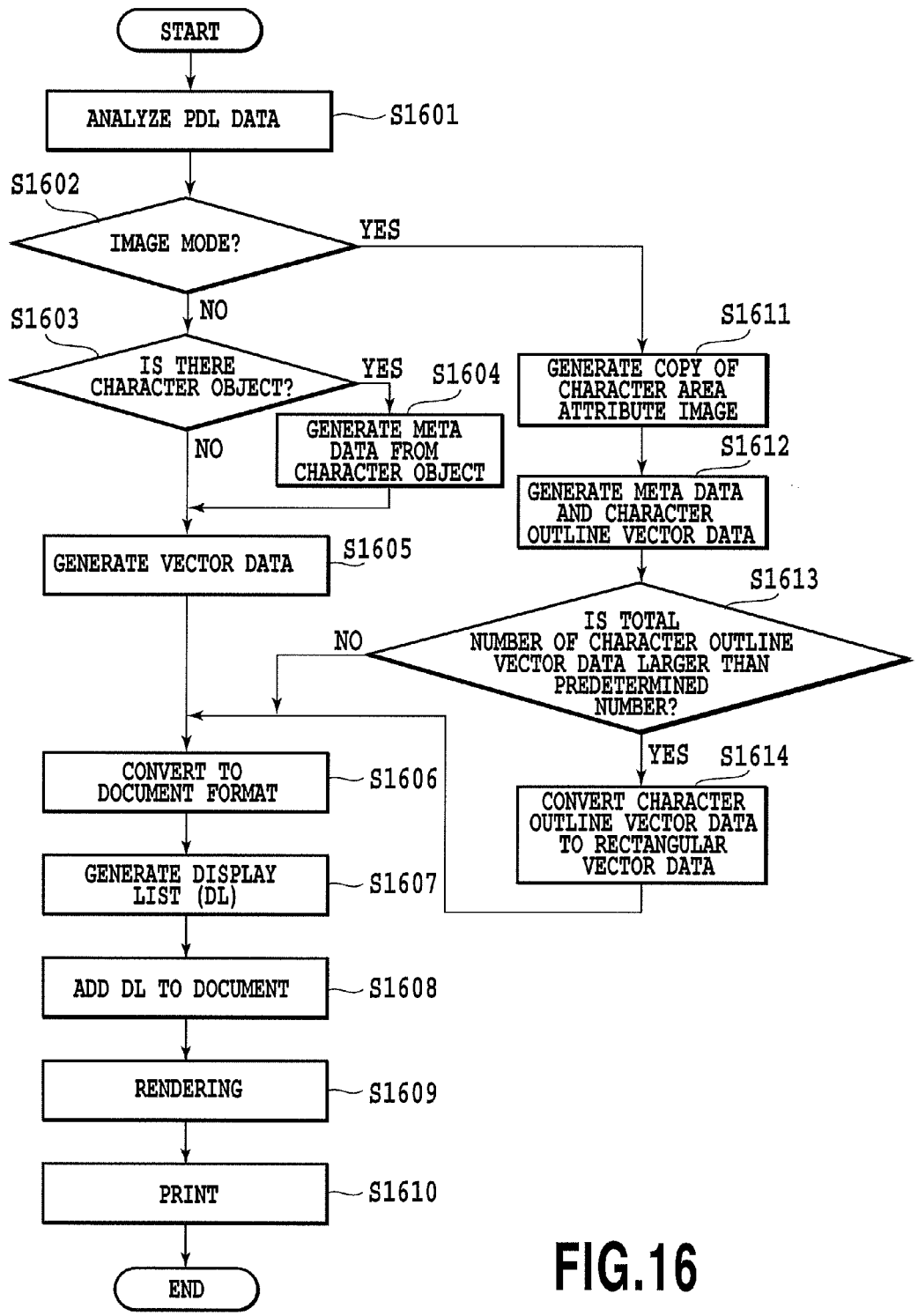
FIG. 16 is a diagram showing an example of dataflow for generating a document from an image-mode PDL and printing in an embodiment.

FIG. 16 shows an example of a process of generation and printing of a document, which is executed in an image processing apparatus capable of processing PDL data generated in an image mode. This is a process for receiving either normal PDL data or image-mode PDL data and generating and printing out a document. The process of the flowchart shown in FIG. 16 is executed by the CPU 101.

First, in step S1601, PDL data is analyzed to discriminate the type of data included in the PDL data. Next, in step S1602, it is judged whether the PDL data is of an image mode.

If it is judged in step S1602 that the PDL data is of an image mode, the process proceeds to step S1611. In step S1611, a copy of image area attribute data (bitmap data indicating the attribute of each pixel (a character attribute area etc.)) included in the PDL data is generated. Further, from the bitmap image area attribute data, a character image area attribute image (data in an area having a character attribute) is extracted. To the character image area attribute image generated in step S1611, a character recognition processing and a vectorization processing are digitally applied in step S1612, so that meta data including character code information and character outline vector data are generated. Also, in step S1612, if a graphic area such as a line drawing can be detected from an image in the PDL, vector data may also be generated on the line drawing part.

The character outline vector data generated in step S1612 is checked in step S1613 as to a total number thereof. When a character to be drawn is a complex Chinese character or the number of characters is large, there is concern that a document to be described later has a huge data size. Therefore, if it is judged in step S1613 that the number of elements of the character outline vector data is larger than a predetermined number, in step S1614, the character outline vector data is converted to simple rectangular vector data. The rectangular vector data converted in step S1614 takes over, from character outline vector data for one character before being converted, drawing position coordinates and information concerning the width and height of a drawing range corresponding to the character size. This is because, when searching for a document stored in the BOX using a character string stored in meta data, it is possible to distinguish the part of a character image corresponding to a search result even with rectangular vector data. Alternatively, there may be provided a command (vector data description) to refer to an external font stored in advance in the device etc., and draw characters so as to match the size of the vector data using character codes of the character recognition result.

Moreover, the reason for such a configuration is because the total number of vector data that composes a character outline may excessively increase according to the quality of an original image, complexity of a character, and largeness of the number of characters. Accordingly, when the amount of data becomes excessively large, not recording character vector data by accurately tracing the outline of a character of an original image but using instead rectangular vector data corresponding to an area including a character allows significantly reducing the amount of vector data. After the process of step S1604 is completed or if it is judged as "NO" in step S1613, the process proceeds to step S1606.

On the other hand, if it is judged in step S1602 to be normal PDL data not of an image mode, the process proceeds to step S1603. In steps S1603 to S1605, the same process as that described in S1502, S1503, and S1509 of FIG. 15 is executed, whereby vector data is generated.

In step S1606, after a conversion into a document format including the vector data, the document is stored in a storage medium such as a BOX. At this time, the meta data and character outline vector data generated in step S1612, the rectangular vector data generated in step S1614, and the vector data generated in step S1605 are added to the document.

Next, a DL (Display List) is generated in step S1607. Then, the process proceeds to step S1608, where the generated DL is added to the document.

A document is generated by a flow up to here. Further, the DL generated in step S1607 is rendered by a rendering processing in step S1609, and printing onto a storage medium is executed by a print processing in step S1610.

Figure 14:
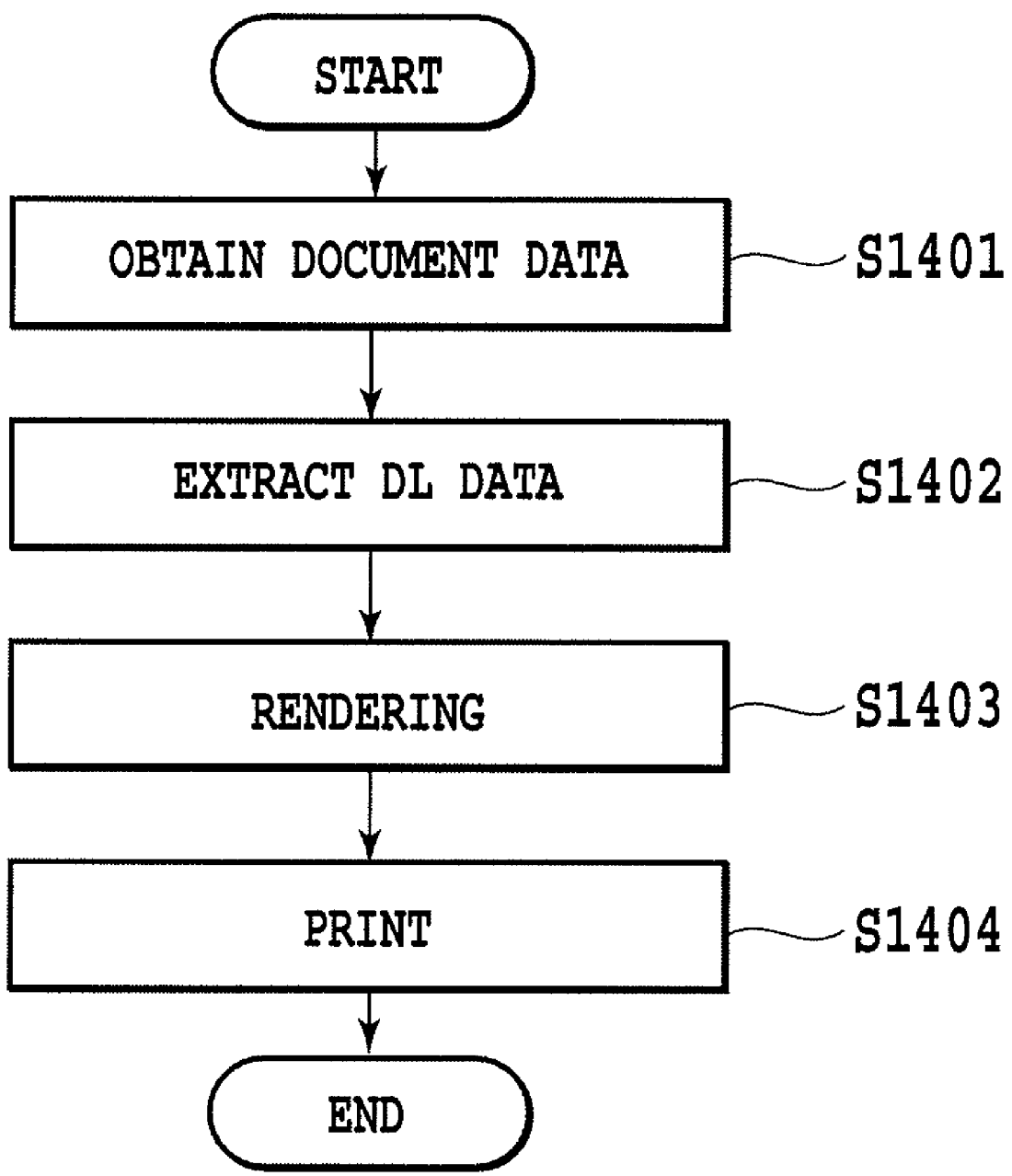
FIG. 14 is a diagram showing an example of dataflow for document printing in the embodiment.

FIG. 14 shows an example of a process when a document stored in a BOX or the like is reprinted. This is a process for reprinting a generated and stored document. The process of the flowchart shown in FIG. 14 is executed by the CPU 101.

First, in step S1401, document data of a printing object is obtained. In step S1402, a DL included in the document is extracted. In step S1403, the DL (Display List) extracted in step S1402 is rendered to a bitmap. Lastly, in step S1404, a print processing onto a paper medium is executed.

Thus, when again performing printing in the same device, a print processing is executed by use of DL data stored in the document, and thus printing can be speedily performed.

Also, the DL data contained in the document is data suitable for the type of a device that has generated the document. Accordingly, when the document is to be printed by another device, it is better to re-prepare DL data suitable for the other device. That is, vector data included in the document is used to re-generate DL data suitable for the other device, and then a rendering and print processing is performed.

<Document Data Structure>

Next, description will be given of the structure of a document.

Figure 11:
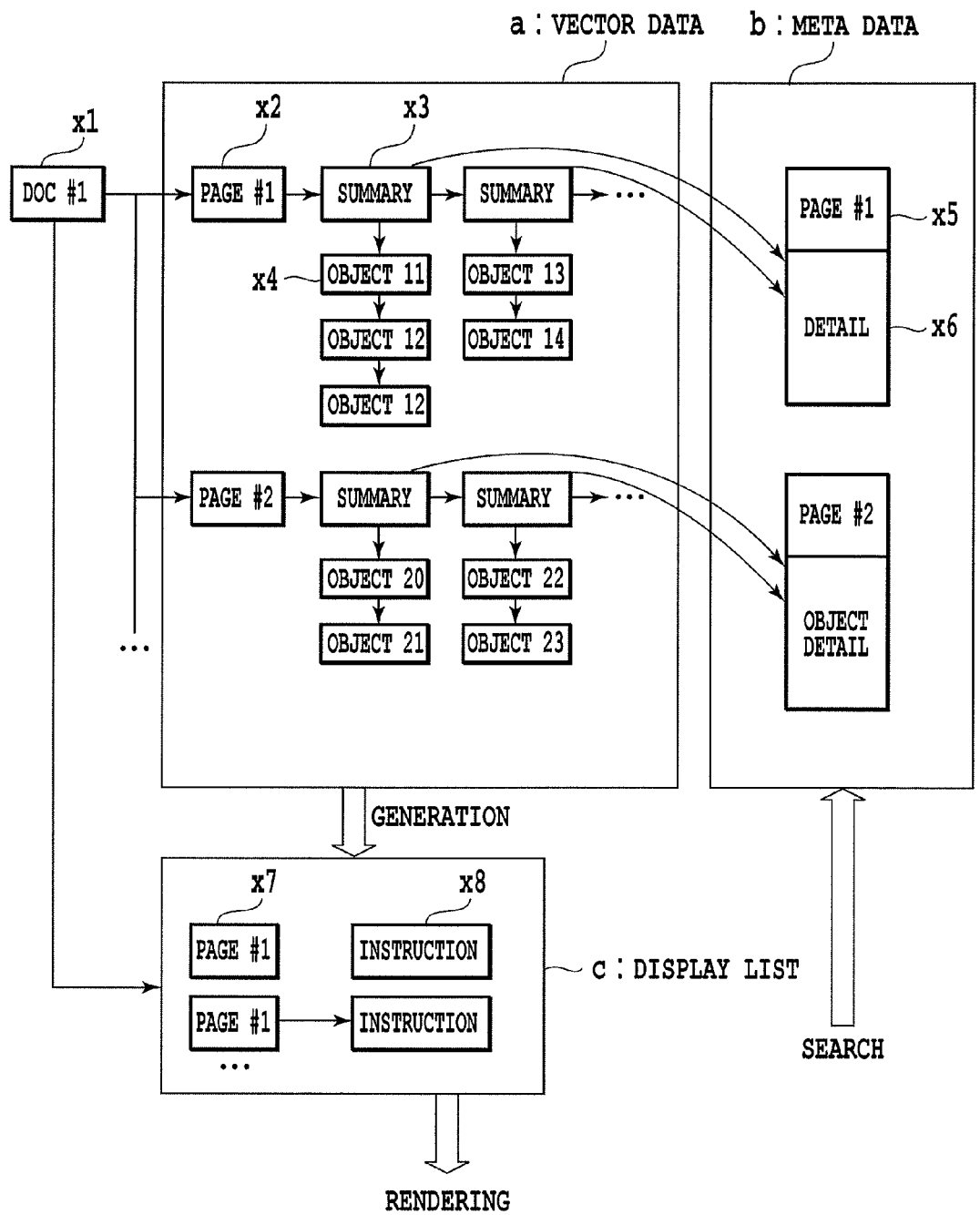
FIG. 11 is a diagram showing an example of the data structure of a document in an embodiment.
Figure 12:
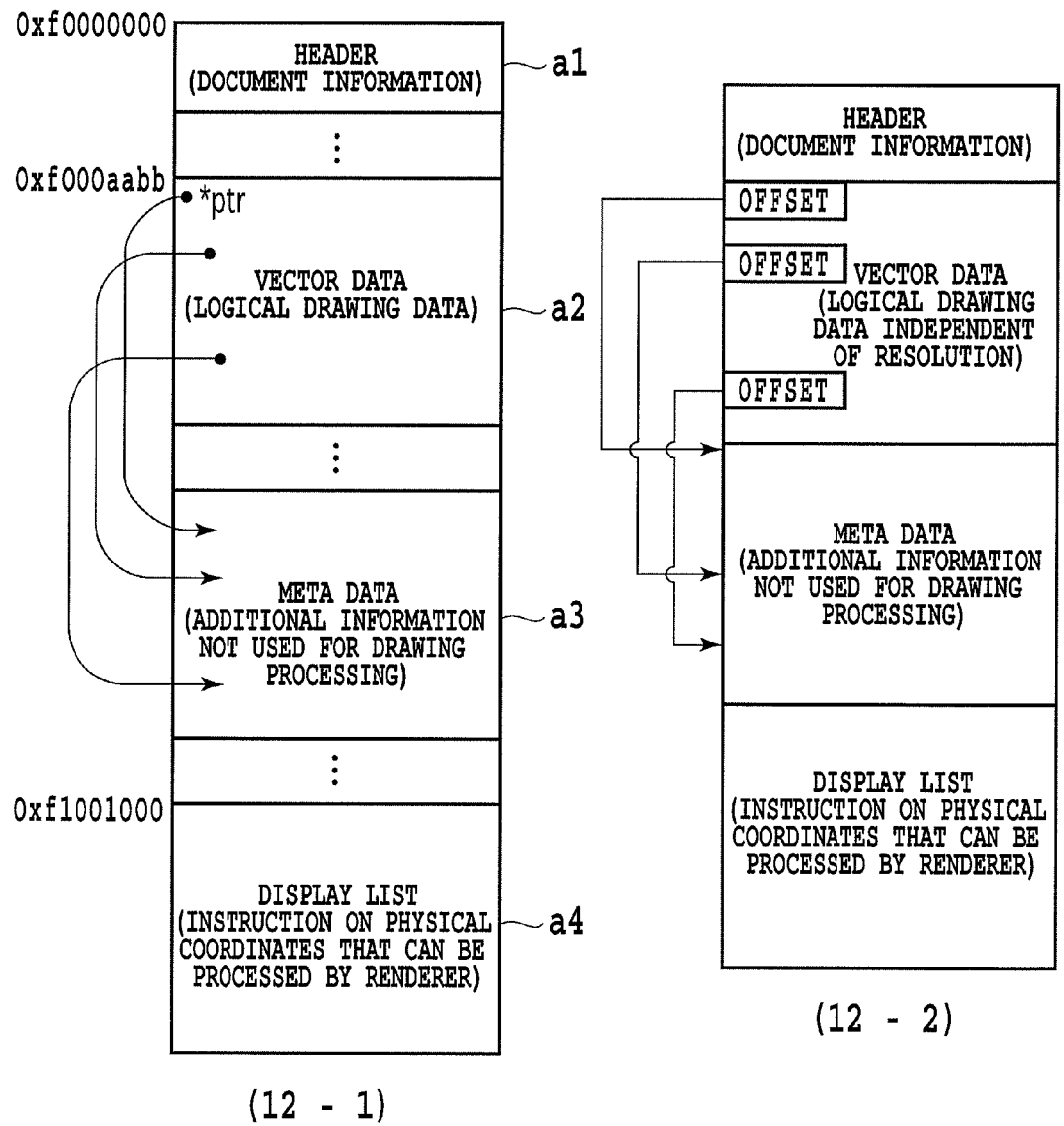
FIG. 12 is a diagram showing examples of the storing structure of a document in an embodiment.
Figure 13:
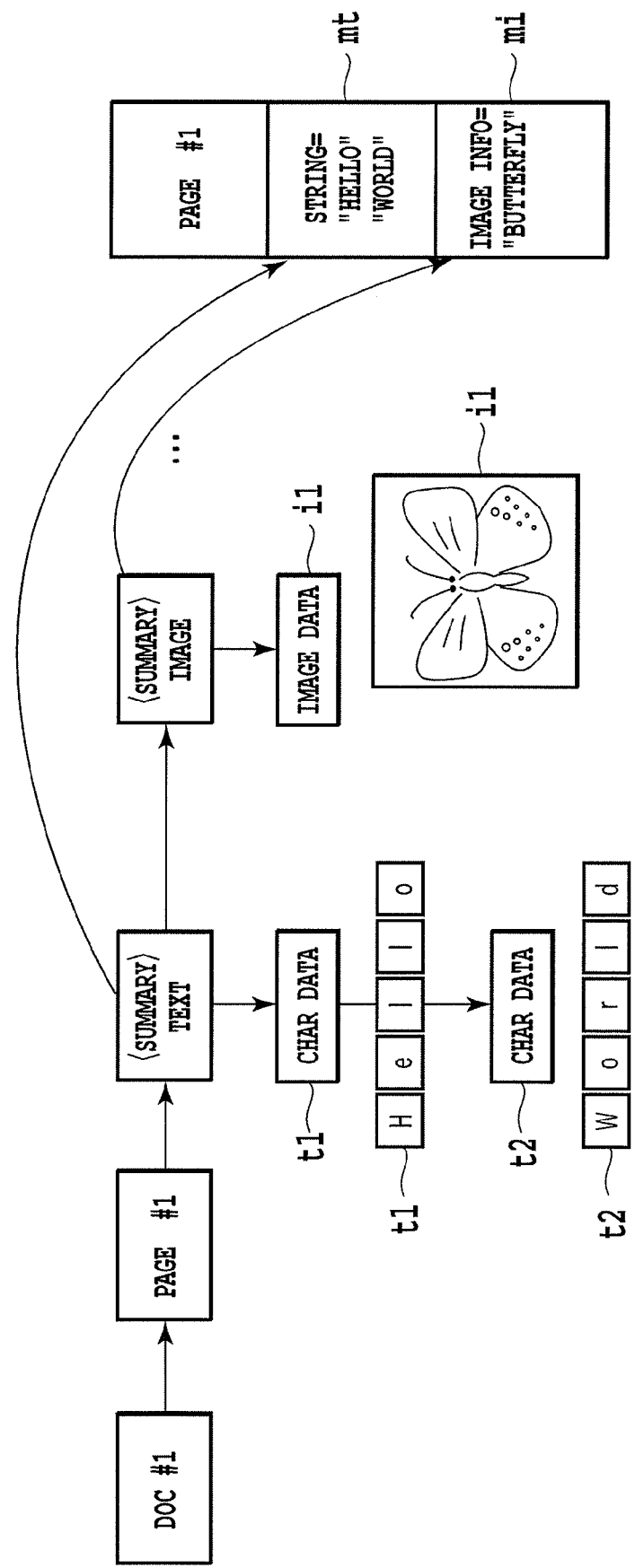
FIG. 13 is a diagram showing an example of document data in an embodiment.

FIG. 11, FIG. 12, and FIG. 13 show examples of the structure of a document.

FIG. 11 shows an example of the data structure of a document.

The document is data having a plurality of pages, which includes mainly vector data (a), meta data (b), and a DL (c), and has a hierarchical structure with a document header (x1) in the head. The vector data (a) further includes a page header (x2), summary information (x3), and an object (x4), and the meta data (b) further includes page information (x5) and detailed information (x6). The DL (c) further includes a page header (x7) and an instruction (x8) for drawing development.

The document header (x1) is described with a storage location of the vector data and a storage location of the DL, and thus the vector data and DL are correlated by the document header (x1).

The page header (x2) is described with layout information such as a size and an orientation of the page. The objects (x4) are each linked with one of the drawing data such as a line, a polygon, and a Bezier curve, and are related with the summary information (x3) in groups of a plurality of related objects. In addition, an image object may be linked as a drawing object (x4). The summary information (x3) collectively expresses characters of a plurality of objects, in which information related to image area attributes etc., is described.

The meta data (b) is additional information for a search having no relationship with a drawing processing.

The page information (x5) area is described with page information such as, for example, whether the meta data is generated from image-mode data or generated from PDL data including a character object. The detailed information (x6) is described with a character string (character code string) generated as OCR information or image information.

Moreover, each summary information (x3) of the vector data (a) refers to the meta data, so that from the summary information (x3), detailed information (x6) concerning each summary information of the meta data can be found.

The DL (c) is intermediate codes for bitmap development by a renderer. The page header (x7) is described with a control table etc., of drawing information (instruction) in the page, and the instruction (x8) includes resolution-dependent drawing information.

Figure 17:
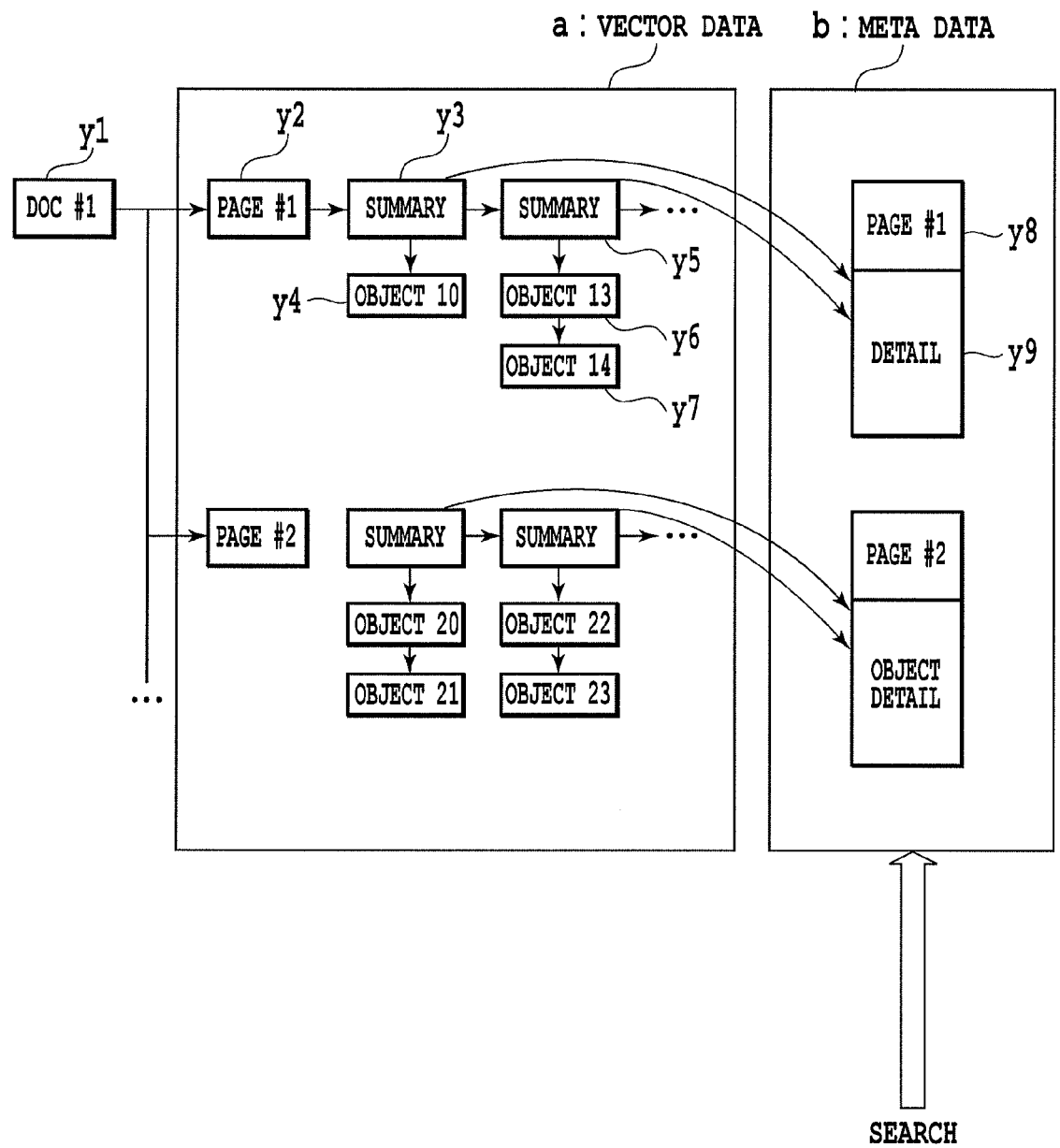
FIG. 17 is a diagram showing an example of the data structure of a document at the time of image-mode PDL processing in an embodiment.

FIG. 17 shows an example of the document structure when PDL data generated in an image mode is processed.

When PDL data generated in an image mode of the host computer is processed, first, a document including one image object (y4) related to one summary information (y3) in one page is generated. It is described in the summary information (y3) that the image object (y4) includes an image plane having color values and an image area attribute plane having image area attribute values. Thereafter, summary information (y5) of character outline vector data generated by a character recognition processing and a vectorization processing is newly added, and in a manner related therewith, a plurality of character outline vector data are added as drawing objects (y6, y7) with no color values. Further, a character string of a character recognition result is described as detailed information (y9) of meta data so as to allow a reference from the summary information (y5) of character outline vector data.

FIG. 13 shows an example of document data.

In summary information of the first page, there is "TEXT" and "IMAGE." The summary information "TEXT" is linked with character outlines of H,e,l,l,o (object t1) and W,o,r,l,d (object t2) as vector data.

Further, the summary information refers to character code strings (meta data mt) of "Hello" and "World."

Moreover, the summary information "IMAGE" is linked with a photo image (JPEG) of a butterfly.

Further, the summary information refers to image information (meta data mi) of "butterfly."

Accordingly, a search may be performed by the following procedures when a text in the page is searched for a keyword of, for example, "World." First, vector page data is obtained in order from the document header, and the summary information linked to the page header is searched for meta data linked to "TEXT."

In PDL data generated in an image mode, summary information to be described first as a document is "IMAGE." The "IMAGE" is linked with a bitmap of the entire face of the page. Meta data to be generated in the process of S1611 from a character image area attribute image through a digital character recognition is added as "TEXT" summary information. The summary information refers to the character code string generated by digital character recognition.

FIG. 12 shows how the data structure described in FIG. 11 is arranged on a memory and on a file.

As shown in 12-1 of FIG. 12, in the present embodiment, for a document, a vector data area, a meta data area, and a DL area are arranged at arbitrary addressees on the memory.

As shown in 12-2 of FIG. 12, in the present embodiment, for a document, a vector data area, a meta data area, and a DL area are serialized in one file.

Embodiment 2

In Embodiment 1, a description has been given for the case where image-mode PDL data is generated by the host computer, while in Embodiment 2, description will be given for the case where image data is received from an image developing device separate from an image output device.

Figure 5:
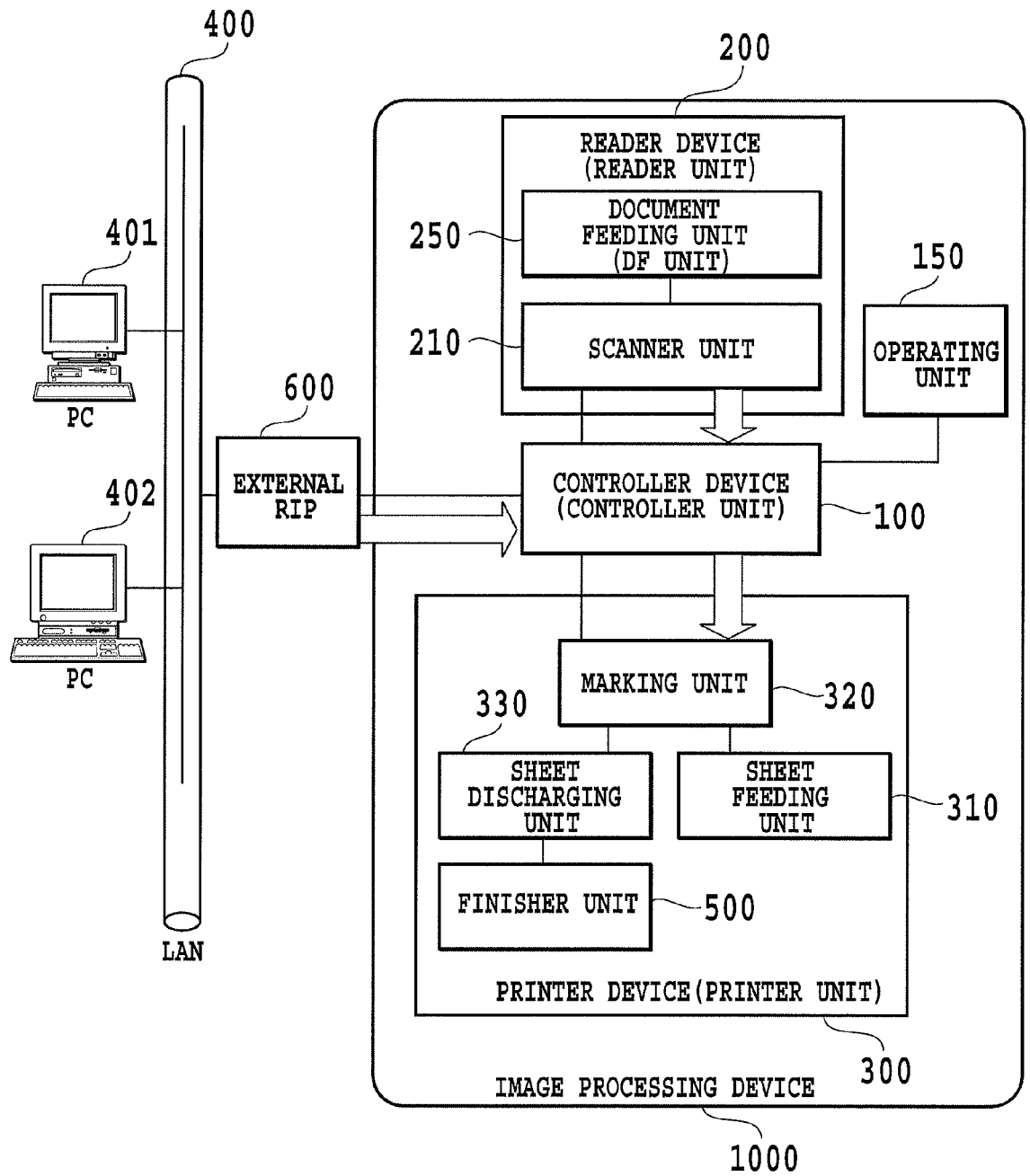
FIG. 5 is a view showing an example of a system according to an embodiment.

FIG. 5 shows an overall outline of Embodiment 2. Embodiment 2 differs from Embodiment 1 in the point that an external RIP 600 is added as a device to perform image development.

The external RIP 600 transmits and receives network data to and from a LAN 400, and transmits and receives network data to and from a controller device 100, and transmits image data thereto.

Figure 6:
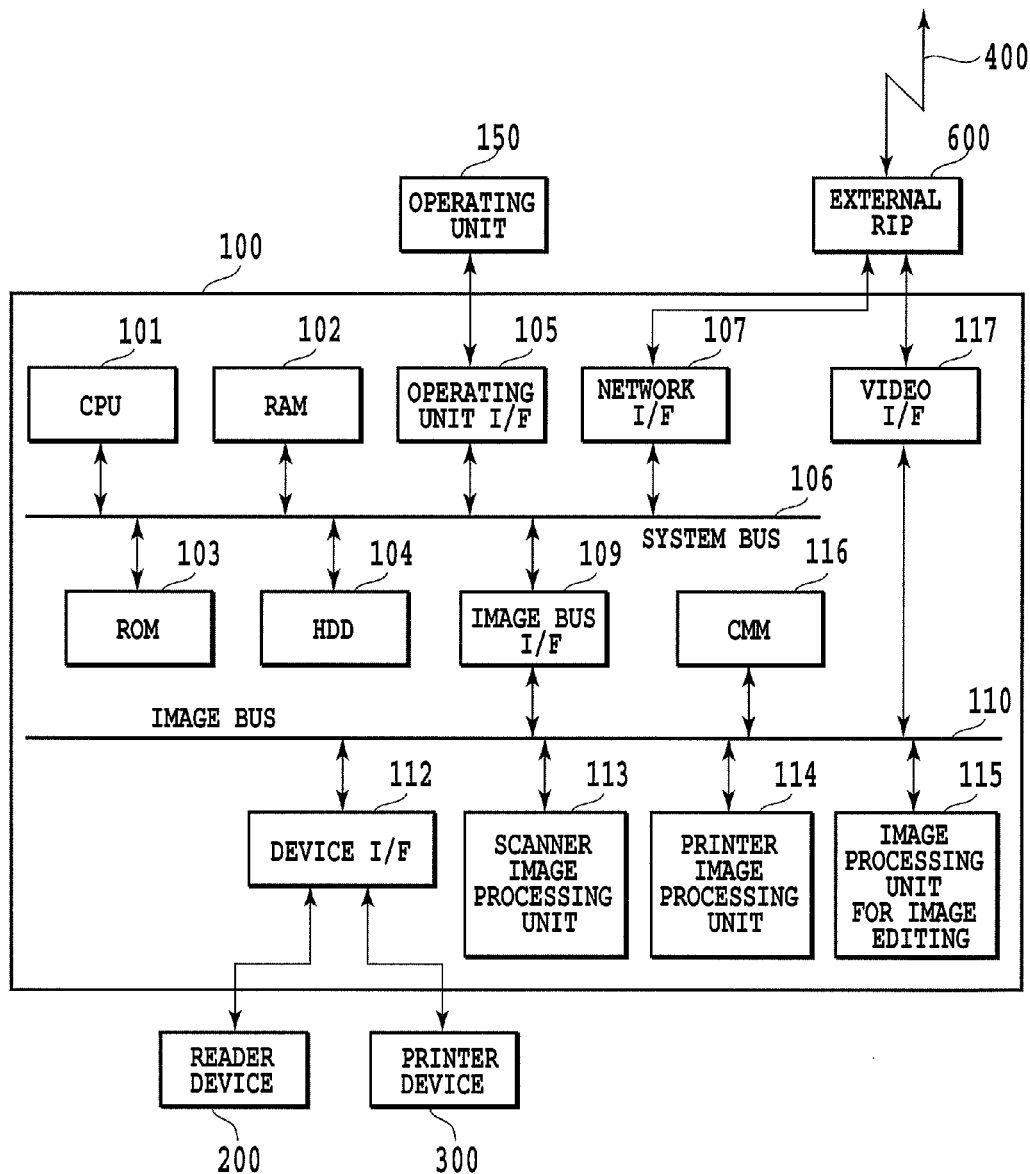
FIG. 6 is a block diagram showing an example of the controller unit of each device in an embodiment.

FIG. 6 shows a block diagram of Embodiment 2. The external RIP 600 is connected with a network I/F (interface) 107 and a video I/F (interface) 117 in a controller device. The video I/F (interface) 117 is connected to an image bus 110, and transmits image data to an image processing unit and a device I/F (interface).

Figure 10:
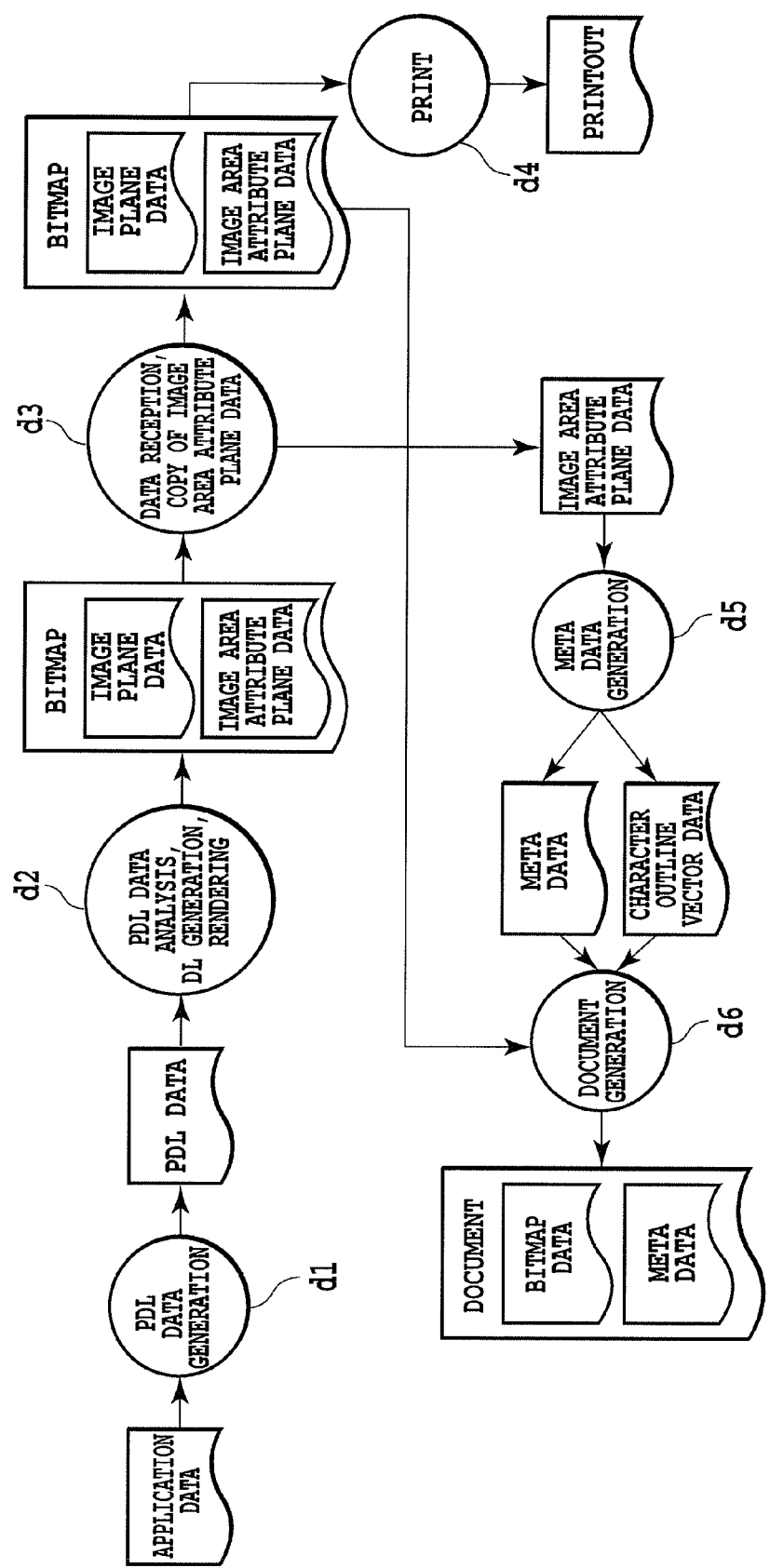
FIG. 10 is a diagram showing an example of dataflow in Embodiment 2.

FIG. 10 shows an example of dataflow in a processing form with an external RIP connected in Embodiment 2.

As shown in FIG. 10, first, a printer driver operating on a PC 401 performs a processing d1 to convert application data to PDL data. An internal data format of the PDL data suffices as long as it is a format where an image development processing is possible in the external RIP 600, and is not mentioned here. Further, the PDL data may also include, besides the object data described above, variables and procedures serving as a programming language, and a device control command for an instruction on operation of a digital MFP. The generated PDL data is transmitted to the external RIP 600 through a network.

The PDL data received by the external RIP 600 is developed into a bitmap by a PDL data analysis processing and a rendering processing d2, and transmitted to a controller device 100. The bitmap includes image plane data and image area attribute plane data.

In a processing d3 shown in FIG. 10, a copy of a text attribute part of image area attribute plane data is generated based on the bitmap data received from the external RIP 600. Thereafter, the bitmap is recorded onto a paper medium by a print processing d4 to become a printout.

Moreover, from the copy of image area attribute plane data generated by the processing d3 shown in FIG. 10, as a result of digital character recognition by a meta data generating processing d5, meta data and character outline vector data are generated. These are also stored in a document by a document generation processing d6 shown in FIG. 10. The processing d5 shown in FIG. 10 is the same as the processing d6 shown in FIG. 8 of Embodiment 1 described above.

Moreover, the document used in the processings shown in FIG. 10 is the same in structure as the document shown in FIG. 17 used in the explanation of Embodiment 1 described above.

Other Embodiments

In the above, although various embodiments have been described in detail, the present invention may be applied to a system including a plurality of devices, and may also be applied to an apparatus including a single device. For example, a scanner, a printer, a PC, a copying machine, a multifunction peripheral, and a facsimile machine can be mentioned.

The present invention can also be achieved by supplying a software program that realizes each function of the embodiment described above to a system or an apparatus directly or remotely, and reading out and executing the supplied program code by a computer included in the system or the like.

Accordingly, for realizing the functions and processing of the present invention by a computer, a program code itself that is installed in the computer also realizes the present invention. That is, a computer program itself for realizing the functions and processing is also an aspect of the present invention.

In that case, as long as there is a program function, the form of a program can be any, such as an object code, a program to be executed by an interpreter, and script data to be supplied to an OS.

As a computer-readable storage medium for supplying the program, for example, a flexible disk, a hard disk, an optical disk, a magnet optical disk, an MO, a CD-ROM, a CD-R, a CD-RW, etc., can be mentioned. Moreover, as a storage medium, a magnetic tape, a nonvolatile memory card, a ROM, a DVD (a DVD-ROM, a DVD-R), etc., can also be mentioned.

Moreover, the program may be downloaded from a website on the Internet/an intranet by using a browser of a client computer. More specifically, the computer program itself of the present invention or a file compressed and including an automatic installing function may also be downloaded from the website into a storage medium such as a hard disk. Moreover, the present invention can also be realized by dividing a program code including the program of the present invention into a plurality of files and downloading the respective files from different websites. That is, a WWW server that makes a plurality of users download a program file to realize the functions and processing of the present invention by a computer may also be included in the present invention.

Moreover, the program of the present invention may be encoded, stored in storage media such as CD-ROMs, and distributed to users. In this case, it may be possible to let only users that have satisfied predetermined conditions download key information for decoding from a website over the Internet/an intranet, decode and execute the coded program with the key information, and install the program in the computer.

Moreover, the functions of the above-described embodiments may be realized by the computer executing a read-out program. Also, based on an instruction of the program, an OS or the like running on the computer may perform a part or whole of actual processing. Of course, in this case as well, the functions of the above-described embodiments can be realized.

Further, a program read out from the storage medium may be written in a memory installed in the function extension board inserted in a computer or the function extension unit connected to a computer. Based on an instruction of the program, a CPU installed in the function extension board or the function extension unit may perform a part or whole of actual processing. This can even realize the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-291140, filed Nov. 8, 2007, which is hereby incorporated by reference herein in its entirety.

What is claimed is:

1. An image processing apparatus connected with a host computer via a network, comprising:
   a receiving unit constructed to receive from the host computer print data including a bitmap image and attribute data of each pixel of the bitmap image, the bitmap image being made by a drawing command included in application data, the attribute data being a bitmap-like attribute data indicating an attribute determined when the bitmap image has been made by a drawing command included in the application data;
   a meta data generating unit constructed to generate meta data by executing a character recognition processing based on pixels having a character attribute in the bitmap-like attribute data;
   a vector data generating unit constructed to generate vector data indicating a character outline based on the pixels having a character attribute in the bitmap-like attribute data;
   a display list generating unit constructed to generate a display list suitable for a print processing by the image processing apparatus;
   a document generating unit constructed to generate a document including the meta data generated by the meta data generating unit, the vector data generated by the vector data generating unit, and the display list generated by the display list generating unit, and to store the generated document in a memory device, wherein the meta data is additional data for a search of the document; and
   a re-printing unit constructed to perform a re-printing of the document stored in the memory device using the display list included in the document when the re-printing is performed in the image processing apparatus, and to perform a re-printing of the document stored in the memory device using vector data included in the document when the re-printing is performed in another image processing apparatus.

2. The image processing apparatus according to claim 1, further comprising a discriminating unit constructed to discriminate whether the print data is print data including the bitmap image and the attribute data of each pixel of the bitmap image or print data described by an object, wherein
   when the discriminating unit discriminates that the print data is print data described by an object, the meta data generating unit extracts a character code from a character object included in the print data and generates the extracted character code as the meta data, while the vector data generating unit analyzes the print data to generate vector data.

3. The image processing apparatus according to claim 1, further comprising a searching unit constructed to search for the document using the meta data stored by the document generating unit.

4. An image processing method executed by an image processing apparatus including a processor, the image processing apparatus being connected with a host computer via a network, the image processing method comprising:
   a step of receiving from the host computer print data including a bitmap image and attribute data of each pixel of the bitmap image, the bitmap image being made by a drawing command included in application data, the attribute data being a bitmap-like attribute data indicating an attribute determined when the bitmap image has been made by a drawing command included in the application data;
   a step of generating meta data by executing a character recognition processing based on pixels having a character attribute in the bitmap-like attribute data;
   a step of generating vector data indicating a character outline based on the pixels having a character attribute in the bitmap-like attribute data;
   a step of generating a display list suitable for a print processing by the image processing apparatus;
   a step of generating and storing a document in a memory device including the meta data generated by the meta data generating step, the vector data generated by the vector data generating step, and the display list generated by the display list generating step, wherein the meta data is additional data for a search of the document; and a step of performing a re-printing of the document stored in the memory device using the display list included in the document when the re-printing is performed in the image processing apparatus, and performing a re-printing of the document stored in the memory device using vector data included in the document when the re-printing is performed in another image processing apparatus.

5. A non-transitory computer readable storage medium storing a computer-executable program for a computer to execute:

a step of receiving print data including a bitmap image and attribute data of each pixel of the bitmap image, the bitmap image being made by a drawing command included in application data, the attribute data being a bitmap-like attribute data indicating an attribute determined when the bitmap image has been made by a drawing command included in the application data;

a step of generating meta data by executing a character recognition processing based on pixels having a character attribute in the bitmap-like attribute data;

a step of generating vector data indicating a character outline based on the pixels having a character attribute in the bitmap-like attribute data;

a step of generating a display list suitable for a print processing by an image processing apparatus; and a step of generating and storing a document in a memory device including the meta data generated by the meta data generating step, the vector data generated by the vector data generating step, and the display list generated by the display list generating step, wherein the meta data is additional data for a search of the document.

* * * * *